US005615028A

United States Patent [19]
Ishiguro et al.

[11] Patent Number: 5,615,028
[45] Date of Patent: Mar. 25, 1997

[54] LIQUID CRYSTAL DISPLAY APPARATUS

[75] Inventors: Kenichi Ishiguro, Tenri; Masahiro Adachi, Nara, both of Japan

[73] Assignee: Sharp Kabushiki Kaisha, Osaka, Japan

[21] Appl. No.: 407,610

[22] Filed: Mar. 21, 1995

[30] Foreign Application Priority Data

Mar. 24, 1994 [JP] Japan ................................ 6-54101
Mar. 15, 1995 [JP] Japan ................................ 7-56203

[51] Int. Cl.⁶ ........................ G02F 1/1343; G02F 1/1335
[52] U.S. Cl. .............................. 349/42; 349/110; 349/139
[58] Field of Search ..................................... 359/54, 59, 87, 359/67

[56] References Cited

U.S. PATENT DOCUMENTS

| 4,385,292 | 5/1983 | Nonomura et al. | 359/59 |
| 5,185,601 | 2/1993 | Takeda et al. | 359/59 |
| 5,459,595 | 10/1995 | Ishiguro et al. | 359/67 |
| 5,459,596 | 10/1995 | Ueda et al. | 359/54 |
| 5,463,483 | 10/1995 | Yamazaki et al. | 359/54 |

FOREIGN PATENT DOCUMENTS

| 289475 | 11/1988 | European Pat. Off. | 359/59 |
| 4-3552 | 1/1992 | Japan . | |
| 6-82821 | 3/1994 | Japan | 359/59 |
| 2090036 | 6/1982 | United Kingdom | 359/87 |

Primary Examiner—William L. Sikes
Assistant Examiner—Tiep H. Nguyen
Attorney, Agent, or Firm—Nixon & Vanderhye P.C.

[57] ABSTRACT

A liquid crystal display apparatus includes a first substrate, a second substrate having a counter electrode, and a liquid crystal layer sandwiched between the first substrate and the second substrates. The first substrate includes: a plurality of pixel electrodes arranged in a matrix; a plurality of source bus lines for transmitting a plurality of data signals, each data line being disposed between columns of the plurality of pixel electrodes; a plurality of active elements for electrically connecting each of the plurality of pixel electrodes to its adjacent source bus line and thereby feeding the plurality of data signals to the plurality of pixel electrodes; and a plurality of gate bus lines for transmitting scanning signals for controlling the plurality of active elements so as to be in a conductive or non-conductive state, each gate bus line being disposed between rows of the plurality of pixel electrodes. The plurality of transmitted data signals are each held by parasitic capacitances of the plurality of source bus lines. The counter electrode has a plurality of apertures, and at least one of the plurality of apertures is disposed in a region opposed to the plurality of source bus lines.

16 Claims, 9 Drawing Sheets

LIQUID CRYSTAL DISPLAY APPARATUS

BACKGROUND OF THE INVENTION

1. Field of the Invention

The present invention relates to a liquid crystal display apparatus, more particularly to a configuration for lowering the parasitic capacitance of a signal line in an active matrix type liquid crystal display apparatus.

2. Description of the Related Art

Recently, a thin film transistor (hereinafter, referred to as "TFT") has been developed to be applied to an image display device such as a flat type display. Especially, a driver monolithic panel using a polysilicon TFT has been actively developed. The technology conventionally developed is described, for example, in Japanese Patent Publication No. 4-3552. Hereinafter, referring to FIG. 8, the apparatus disclosed in this publication will be described.

FIG. 8 is a block diagram showing a conventional active matrix type liquid crystal display apparatus 101 (hereinafter, referred to as "display apparatus") using TFTs. FIG. 9 is a diagram showing an electric equivalent circuit corresponding to each one of the pixels of the display apparatus 101. The display apparatus 101 includes a scanning substrate 103 and a counter substrate 113 opposed to each other, as well as a liquid crystal layer injected between the substrates 103 and 113. The peripheral portions of both of the substrates are sealed by a seal member. On the scanning substrate 103, a plurality of source bus lines 104 parallel with one another, and a plurality of gate bus lines 105 parallel with one another are disposed. The source bus lines 104 and the gate bus lines 105 perpendicularly cross each other. In the vicinity of each of the intersections between the source bus lines 104 and the gate bus lines 105, one pixel is disposed. Namely, a plurality of pixels are disposed in a matrix on the scanning substrate 103.

Each pixel includes an equivalent capacitance 106 of the liquid crystal layer and parasitic capacitances 107, 108 and 109. The parasitic capacitance 107 is a capacitance formed at the intersection between the source bus line 104 and the gate bus line 105. The parasitic capacitance 108 is a capacitance formed by the source bus line 104 and a counter electrode (not shown) on the counter substrate 113. The parasitic capacitance 109 is a capacitance formed by the gate bus line 105 and the counter electrode. Into the equivalent capacitance 106, an electric charge is injected through a pixel electrode 102. The pixel electrode 102 is connected to the drain electrode of a TFT 110 provided for each pixel. The gate electrode of the TFT 110 is connected to the gate bus line 105, while the source electrode thereof is connected to the source bus line 104. Each TFT 110 is electrically switched between conductive and non-conductive states by a scanning signal from the gate bus line 105. The source bus line 104 and the gate bus line 105 are connected to a data output circuit 111 and a scanning circuit 112, respectively.

The display apparatus 101 operates in the following manner. To the data output circuit 111, a video signal is input. This video signal has the polarity reversed for each horizontal scanning period. The data output circuit 111 samples the video signal at predetermined intervals during the horizontal scanning period. Also, the data output circuit 111 outputs the sampled video signal, in each of the horizontal scanning periods. The video signal applied to the source bus line 104 is held in the above-mentioned parasitic capacitances 107 and 108, so as to be written onto the capacitance 106 during a period when the TFT 110 is conductive.

In the conventional liquid crystal display apparatus operating in the above-mentioned manner, the sum of the parasitic capacitances 107 and 108 for each source bus line 104 is expressed by the following equation (1):

$$C = ng \times (C_{gs} + C_{s-bar}) \tag{1}$$

where, ng stands for the number of the gate bus lines 105, $C_{gs}$ stands for the capacitance of the parasitic capacitance 107, and $C_{s-bar}$ stands for the capacitance of the parasitic capacitance 108.

When the display apparatus is large-sized, the total parasitic capacitance of one source bus line 104, especially the capacitance $C_{s-bar}$ of the parasitic capacitance 108 increases, which results in a great load on the data output circuit 111. For this reason, it has been impossible to apply the conventional technology to a large-sized apparatus such as 10.4 type and 8.4 type. Also, in the case of a small-sized apparatus, when it is attempted to fabricate the apparatus for displaying a high definition image, the number of the gate bus lines 105 becomes large. This results in an increase in the number of the parasitic capacitances 107 located at the intersections between the gate bus lines 105 and the source bus lines 104. As a result, similar to a case of the large-sized apparatus, the driving ability of the data output circuit 111 is deteriorated.

As another conventional technology for overcoming such a problem, there is proposed a method in which a capacitor for holding the video signal is provided for each of the source bus lines 104 connected to the data output circuit 111, and an amplifier circuit is provided between each capacitor and the corresponding source bus line 104. However, the method leads to a rise in the consumption of electric power and an increase in the number of elements constituting the circuit. As a result, the deficiency ratio and the fabrication costs also increase.

SUMMARY OF THE INVENTION

The liquid crystal display apparatus of the present invention includes a first substrate, a second substrate having a counter electrode, and a liquid crystal layer sandwiched between the first substrate and the second substrates, the first substrate including: a plurality of pixel electrodes arranged in a matrix; a plurality of source bus lines for transmitting a plurality of data signals, each data line being disposed between columns of the plurality of pixel electrodes; a plurality of active elements for electrically connecting each of the plurality of pixel electrodes to its adjacent source bus line and thereby feeding the plurality of data signals to the plurality of pixel electrodes; and a plurality of gate bus lines for transmitting scanning signals for controlling the plurality of active elements so as to be in a conductive or non-conductive state, each gate bus line being disposed between rows of the plurality of pixel electrodes, wherein the plurality of transmitted data signals are each held by parasitic capacitances of the plurality of source bus lines, and wherein the counter electrode has a plurality of apertures, and at least one of the plurality of apertures is disposed in a region opposed to the plurality of source bus lines.

Thus, the invention described herein makes possible an advantage of providing a large-sized display apparatus and a display apparatus for displaying a high definition image without making a circuit configuration more complicated, by reducing the parasitic capacitance and optimizing the capacitance value of the parasitic capacitance.

DESCRIPTION OF THE PREFERRED EMBODIMENTS

The liquid crystal display apparatus of the present invention will be described with reference to the accompanying drawings.

EXAMPLE 1

Figure 1:
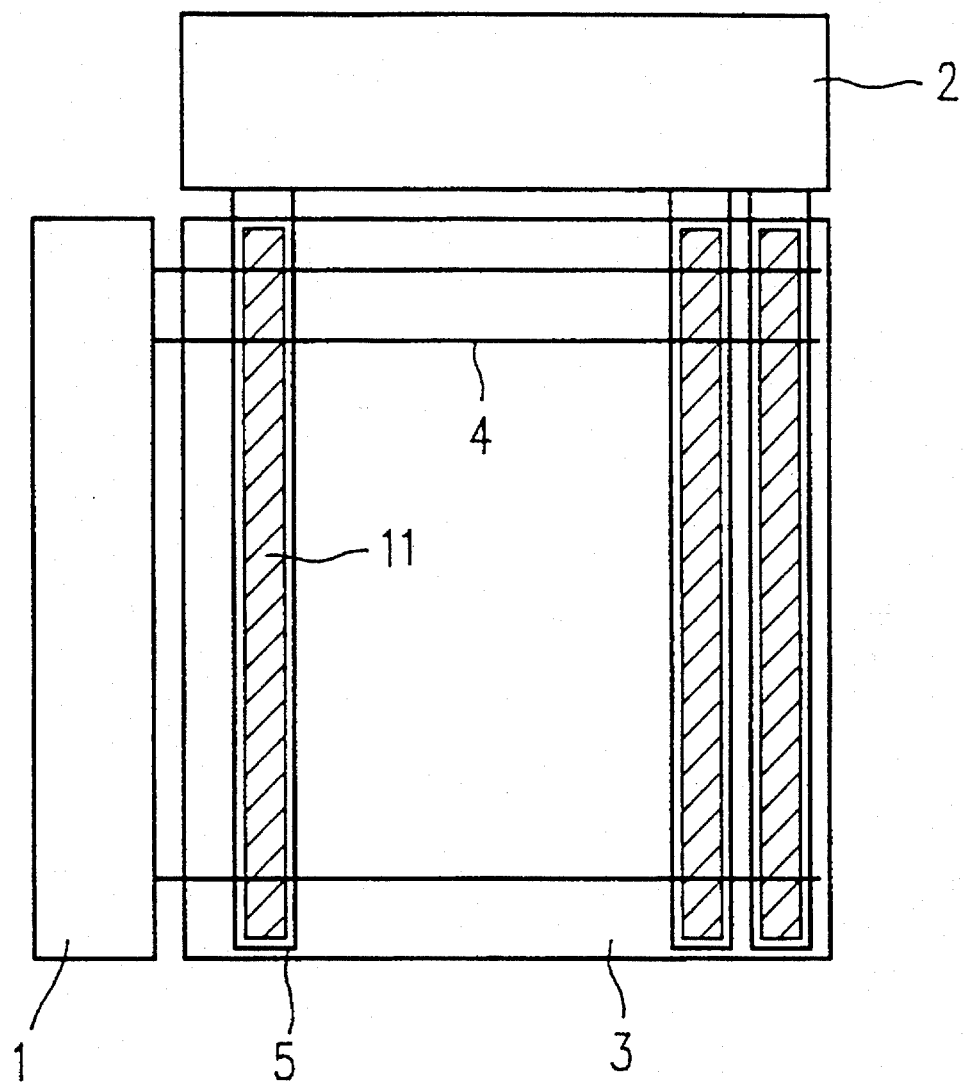
FIG. 1 is a plan view showing the liquid crystal display apparatus of a first example of the present invention.
Figure 2:
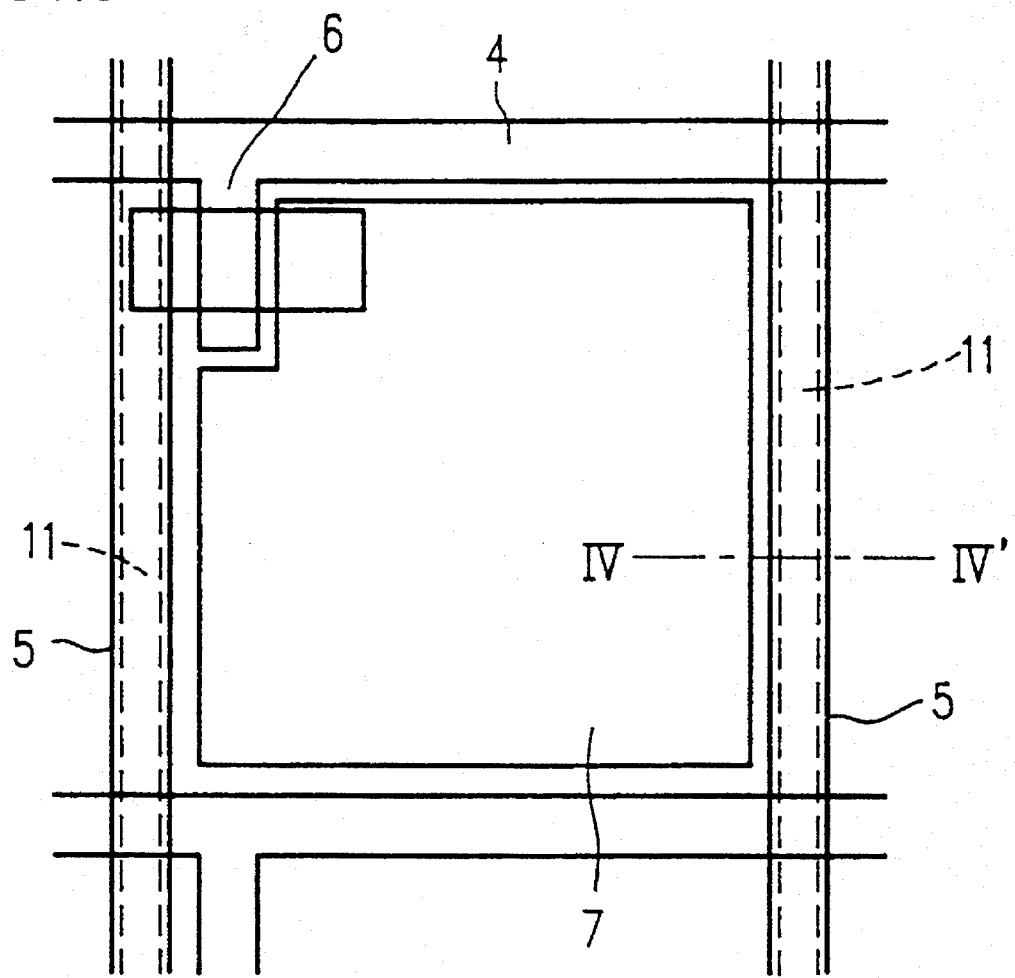
FIG. 2 is a diagram showing a part of the apparatus shown in FIG. 1 in an enlarge form, the part corresponding to one pixel.
Figure 4A:
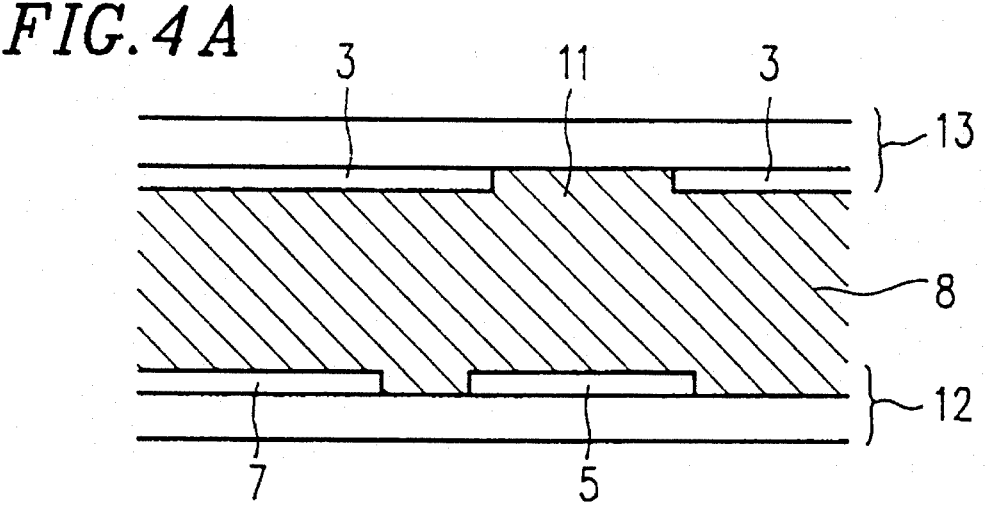
FIG. 4A is a cross sectional view showing the liquid crystal display apparatus shown in FIG. 2, taken along the line IV—IV'.
Figure 5:
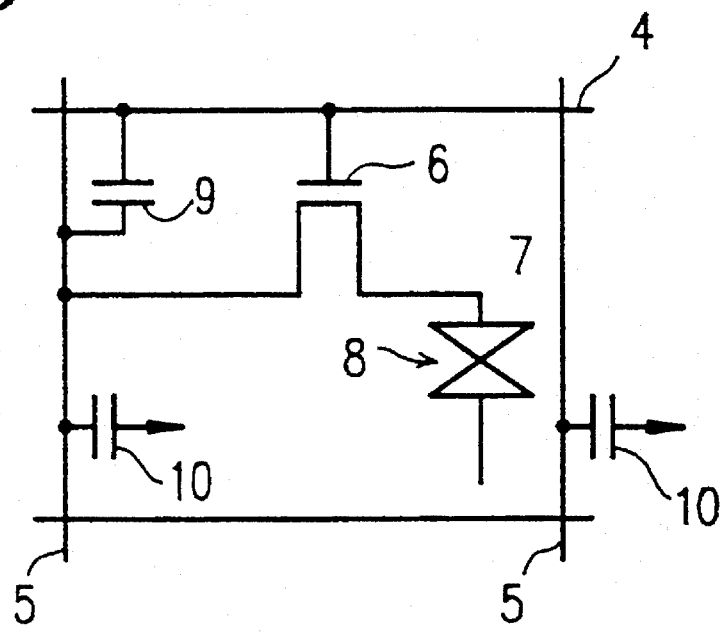
FIG. 5 is a diagram showing an equivalent circuit corresponding to one pixel of the liquid crystal display apparatus.
Figure 6:
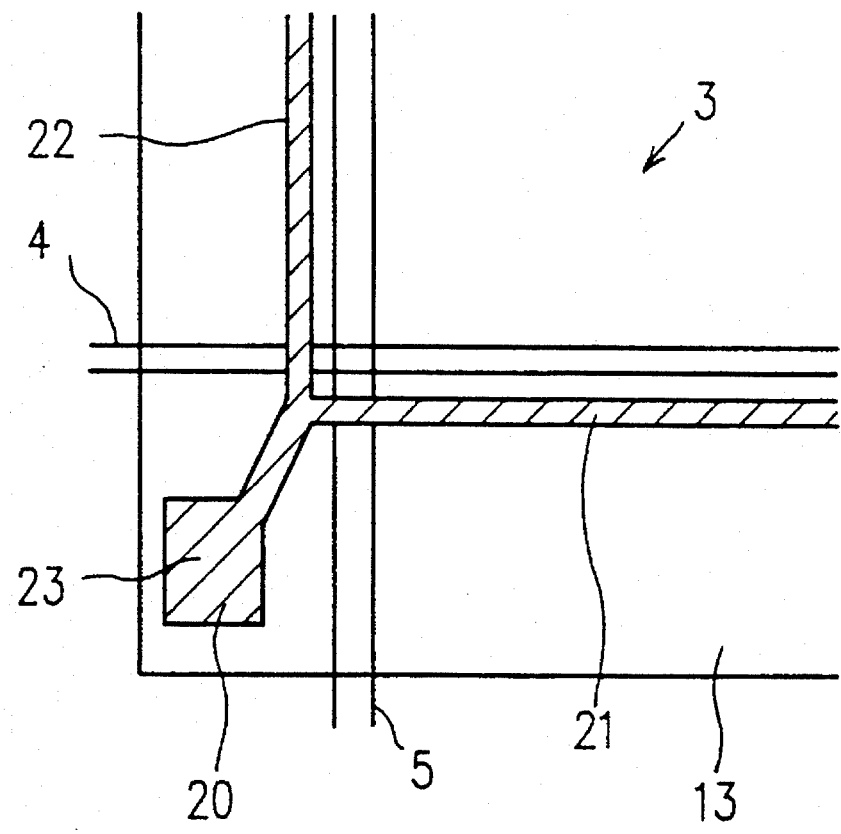
FIG. 6 is a plan view showing the edge portion of the panel of the liquid crystal display apparatus shown in FIG. 1.

FIG. 1 is a diagram schematically showing the configuration of the liquid crystal display apparatus according to the present invention. FIG. 2 is a partial enlarged view showing a part of the apparatus shown in FIG. 1, the part corresponding to one pixel. FIG. 4A is a cross sectional view taken along the line IV—IV'. FIG. 5 is a diagram showing an electric equivalent circuit corresponding to one pixel of the liquid crystal display apparatus shown in FIG. 1. FIG. 6 is a plan view showing the edge portion of the panel shown in FIG. 1.

The liquid crystal display apparatus of the present example includes a substrate 12 on which a display section having a plurality of pixels is formed, and a substrate 13 on which a counter electrode 3 is formed. The substrates 12 and 13 are arranged so as to oppose to each other, and a liquid crystal layer 14 is sandwiched between the substrates 12 and 13.

FIG. 2 shows a part corresponding to one of the pixels of the display section. The display section has gate bus lines 4 and source bus lines 5 disposed so as to perpendicularly cross the gate bus lines 4. A TFT 6 is connected to the vicinity of each of the intersections between the bus lines 4 and 5. The gate bus lines 4 and the source bus lines 5 are connected to a scanning circuit 1 and a data output circuit 2, respectively. To the drain electrode of the TFT 6, a pixel electrode 7, which is one of two electrodes constituting a pixel capacitance 8 (see FIG. 5), is connected. A part of the pixel electrode 7 may be overlapped on at least one of the bus lines 4 and 5. In this case, the overlapping part of the pixel electrode 7 needs to be insulated from the bus line.

Also, as shown in FIG. 4A, the substrate 13 has the counter electrode 3. A plurality of apertures 11 are provided in the counter electrode 3 at the portions which are opposed to the source bus lines 5. Each aperture 11 is formed in the shape of a strip.

Next, the operation of the liquid crystal display apparatus shown in FIG. 1 will be described. A video signal is externally input to the data output circuit 2. The data output circuit 2 samples the video signal and outputs it to each of the source bus lines 5 in each of horizontal scanning periods. The output video signal is held by the parasitic capacitances 9 and 10 on the source bus line 5 over the horizontal scanning period, and written onto the pixel electrode 7 during a time period starting when the TFT 6 is turned ON and terminated when the TFT 6 is turned OFF. As shown in FIG. 5, the parasitic capacitance 9 is a capacitance formed at the intersection between the gate bus line 4 and the source bus line 5, while the parasitic capacitance 10 is a capacitance formed between the source bus line 5 and the counter electrode 3. As described above, in the present example, the apertures 11 are provided in the counter electrode 3 at the portions opposed to the source bus lines 5. Consequently, it is possible to make the capacitance value of the parasitic capacitance 10 smaller than conventional one.

Furthermore, the size of the aperture 11 (especially, the width of the aperture 11) is adjusted in consideration of the driving ability of the data output circuit 2, the capacitance necessary for holding a video signal, and the like. For example, if almost all of the necessary capacitance can be provided only by the parasitic capacitance 9, the width of the aperture 11 can be made substantially as large as that of the source bus line 5. In a case where the necessary capacitance cannot be assured by the parasitic capacitance 9 only, the width of the aperture 11 is set so that the total capacitance of the parasitic capacitances 9 and 10 exceeds at least the necessary capacitance.

In this way, the capacitance value of the parasitic capacitance 10 on each source bus line 5 can be decreased by providing the aperture 11 of the counter electrode 3. As a result, the load on the data output circuit 2 can be reduced.

Though the apertures 11 of the present example are strip-shaped, the same effects as those of the present example are obtained also in a case where the apertures 11 are formed into any other shapes.

Figure 4B:
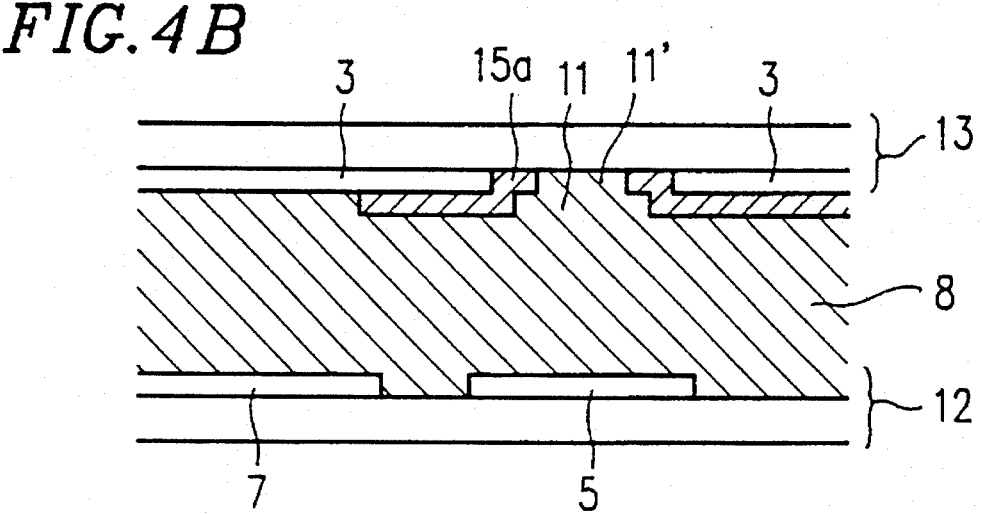
FIG. 4B is a cross sectional view taken along the line IV—IV', showing one modification of the liquid crystal display apparatus shown in FIG. 2, in which a light blocking film is provided.
Figure 4C:
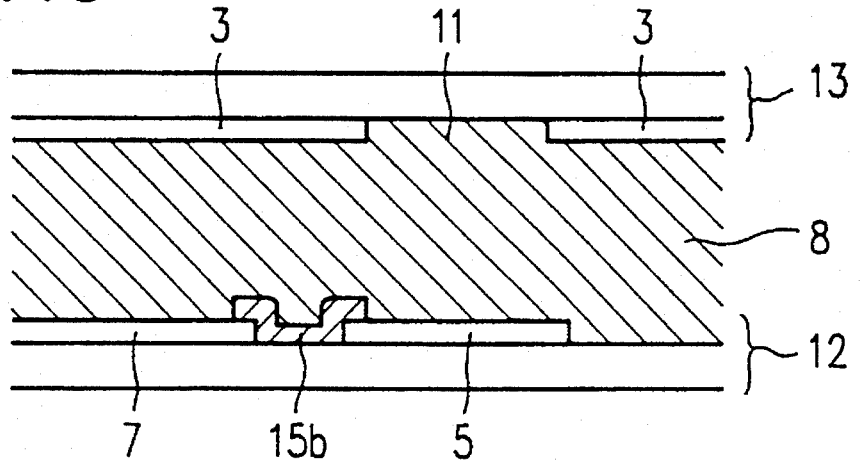
FIG. 4C is a cross sectional view taken along the line IV—IV', showing another modification of the liquid crystal display apparatus shown in FIG. 2, in which a light blocking film is provided.

Moreover, in order to enhance the contrast in an image displayed by the display apparatus, the display apparatus may be provided with a light blocking film for blocking the light transmitted through the gap between the pixel electrode 7 and the adjacent gate bus line 4 or the source bus line 5. In a case of forming the light blocking film 15a made from a thin metal film onto the substrate 13, apertures 11' similar to those provided in the counter electrode 3 may be formed also in the light blocking film 15a as shown in FIG. 4B, whereby the same effects as those in a case of providing no light blocking film are assured. Moreover, in a case of producing the light blocking film 15b from an insulating material, the film 15b may be formed on either of the substrates 12 or 13. FIG. 4C shows a cross sectional view in a case where the light blocking film 15b is formed on the substrate 12.

The data output circuit 2 may be formed on the substrate 12. In this case, it is desirable that the active elements included in the data output circuit 2 and the display section are transistors having a mobility of $\mu \geq 5$ cm$^2$/V·s. As such a transistor, for example, a transistor having a substrate or a thin film made of polycrystalline silicon, singlecrystalline silicon, sapphire or diamond, which includes a polycrystalline silicon TFT, a singlecrystalline silicon TFT and a sapphire-on-silicon (SOS) element, is usable.

Hereinafter, the reasons why it is desirable to cause the mobility $\mu$ of the active element formed on the substrate 12 to be 5 cm$^2$/V·s or more are described.

The lower limit value of the mobility $\mu$ of the active element, which is 5 cm$^2$/V·s, is determined based on the simulation concerning the circuit design, performed by the inventors of the present invention. In this simulation, when the mobility $\mu$ of the active element is set at 5 cm$^2$/V·s or more, which is a value approximate to the upper limit value of the mobility of the active element using a film of amorphous silicon, satisfactory results were obtained. In the liquid crystal display apparatus of the present invention, of which the active element has a mobility $\mu$ of 5 cm$^2$/V·s or more, the mobility of the active element is large. Hence, the active elements constituting the TFTs or circuits of the pixel section can be small-sized. Accordingly, the necessity of taking into consideration such problems as the lowering of yield and an opening ratio or the like is eliminated. Conversely, in a case where the mobility $\mu$ is less than 5 cm$^2$/V·s, the liquid crystal display apparatus of the present invention needs to be provided with a complicated circuit, because the pixel capacitance 8 cannot be sufficiently charged. It was ascertained that this may cause lowering of the yield in the fabricating process.

Incidentally, when the plurality of apertures 11 are provided in the counter electrode 3, the resistance of the counter electrode 3 as a whole increases. As a result, in a case where the display apparatus is large-sized, the fall of voltage occurs within the counter electrode 3. Since the input terminals of the counter electrode 3 are formed at the four corners of the display section, there arises a difference of voltage between the parts around the four corners and the central part of the display section, which makes it impossible to display an even image. For preventing this, an auxiliary electrode 20 may be provided in the peripheral portion of the counter electrode 3 as shown in FIG. 6. As a material for the auxiliary electrode 20, a conductive material such as Al, Cr, Ti and the like may be used. The auxiliary electrode 20 has a row direction portion 21 extending along the direction in which the gate bus line 4 extends, a column direction portion 22 extending along the direction in which the source bus line 5 extends, and an electrode portion 23 connected to the intersection of these portions 21 and 22.

In the present example, the configuration of the display section is not limited to the one shown in the figures. For example, other components such as an additional capacitance may be provided if necessary.

EXAMPLE 2

Figure 3:
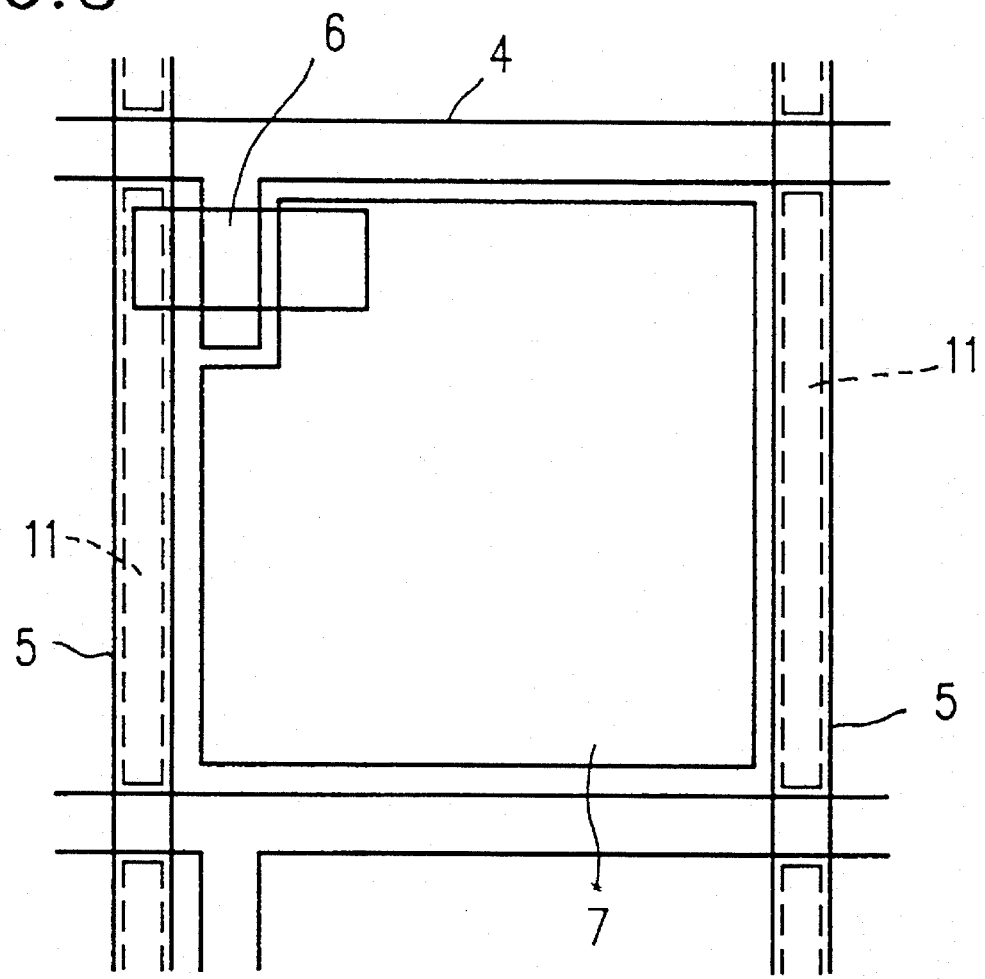
FIG. 3 is a plan view showing a part of the liquid crystal display apparatus of a second example of the present invention, the part corresponding to one pixel.

FIG. 3 is a plan view showing the main portions of the liquid crystal display apparatus of a second example of the present invention. The liquid crystal display apparatus of the present example has a configuration similar to that of the first example excepting that the shape of the aperture 11 of the counter electrode 3 is different. Moreover, the liquid crystal display apparatus of the present example is, as an electric circuit, equivalent to the display apparatus of the first example. Accordingly, a display operation can be performed in a manner similar to that of the first example.

The aperture 11 of the present example is in the shape of an elongated rectangular hole. In the same row, the aperture 11 is not contiguous to the adjacent one, being separated by a space located therebetween.

Also in the present example, since the counter electrode 3 has the apertures 11, the capacitance value of the parasitic capacitance 10 formed between the source bus line 5 and the counter electrode 3 can be made small. Herein, the size of the aperture 11 in the extending direction of the source bus line 5 and that in the widthwise direction of the source bus line 5 are determined in consideration of the driving ability of the data output circuit 2, the capacitance value of the parasitic capacitance 9, the capacitance value necessary for holding a video signal, and the like. In the extending direction of the source bus line 5, the aperture 11 shown in FIG. 3 is sized to be approximately the same as the interval between the gate bus lines 4. In the widthwise direction of the source bus line 5, this aperture 11 is sized to be approximately the same as the width of the source bus line 5. However, the sizing of the aperture 11 is not limited to this.

Also, in a case where the apertures 11 are formed into a shape other than the elongated hole as shown in FIG. 3, the same effects as those described for the present invention are obtained.

Furthermore, in order to enhance the display contrast of the display apparatus, the display apparatus may be provided with a light blocking film for blocking the light transmitted through the gap between the pixel electrode 7 and the adjacent bus line. In a case where the light blocking film 15a made from a metallic thin film is formed on the substrate 13, apertures 11' similar to those formed in the counter electrode 3 may be formed in the light blocking film 15a as shown in FIG. 4B, whereby the same effects as those obtained when providing no light blocking film are assured. In a case of using a light blocking film 15b made of an insulating material, the light blocking film 15b may be provided on either of the substrate 12 as shown in FIG. 4C or the substrate 13.

The data output circuit 2 may be formed on the substrate 12. In this case, it is preferable that the active elements included in the data output circuit 2 and the display section are transistors having a mobility of $\mu \geq 5$ cm$^2$/V·s. As such a transistor, for example, the transistor having a substrate or a thin film formed of polycrystalline silicon, singlecrystalline silicon, sapphire and diamond, which includes a polycrystalline silicon TFT, a singlecrystalline silicon TFT and a sapphire-on-silicon (SOS) element, is usable.

Also, in a case where the provision of the apertures 11 makes the value of the resistance of the counter electrode 3 increase and results in an apprehension that display defects may occur, an auxiliary electrode 20 may be provided in the peripheral portion of the counter electrode 3. The auxiliary electrode 20 may be formed of a conductive material such as Al, Cr and Ti.

In addition, the configuration of the display section of the present example is not limited to that shown in the figures. For example, the component such as an additional capacitance or the like may be provided if necessary.

EXAMPLE 3

Figure 7:
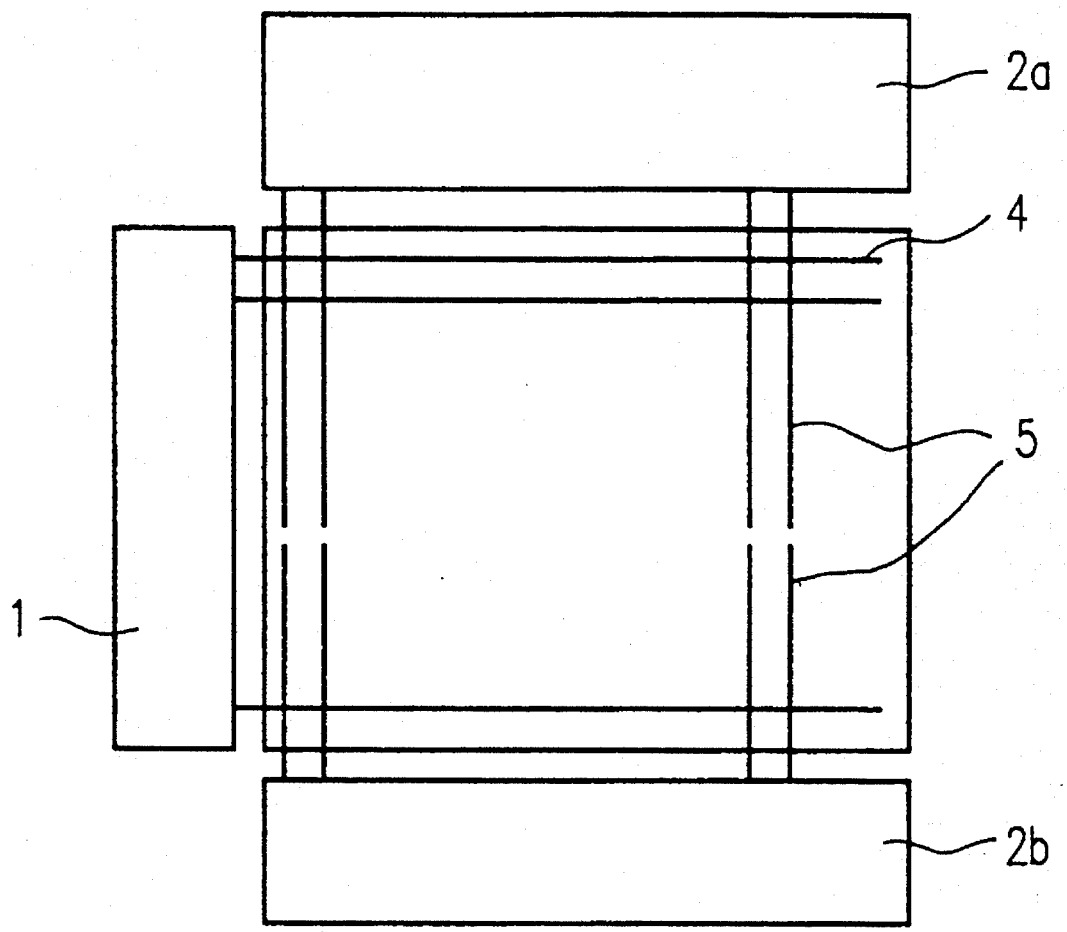
FIG. 7 is a plan view showing the liquid crystal display apparatus of a third example of the present invention.
Figure 8:
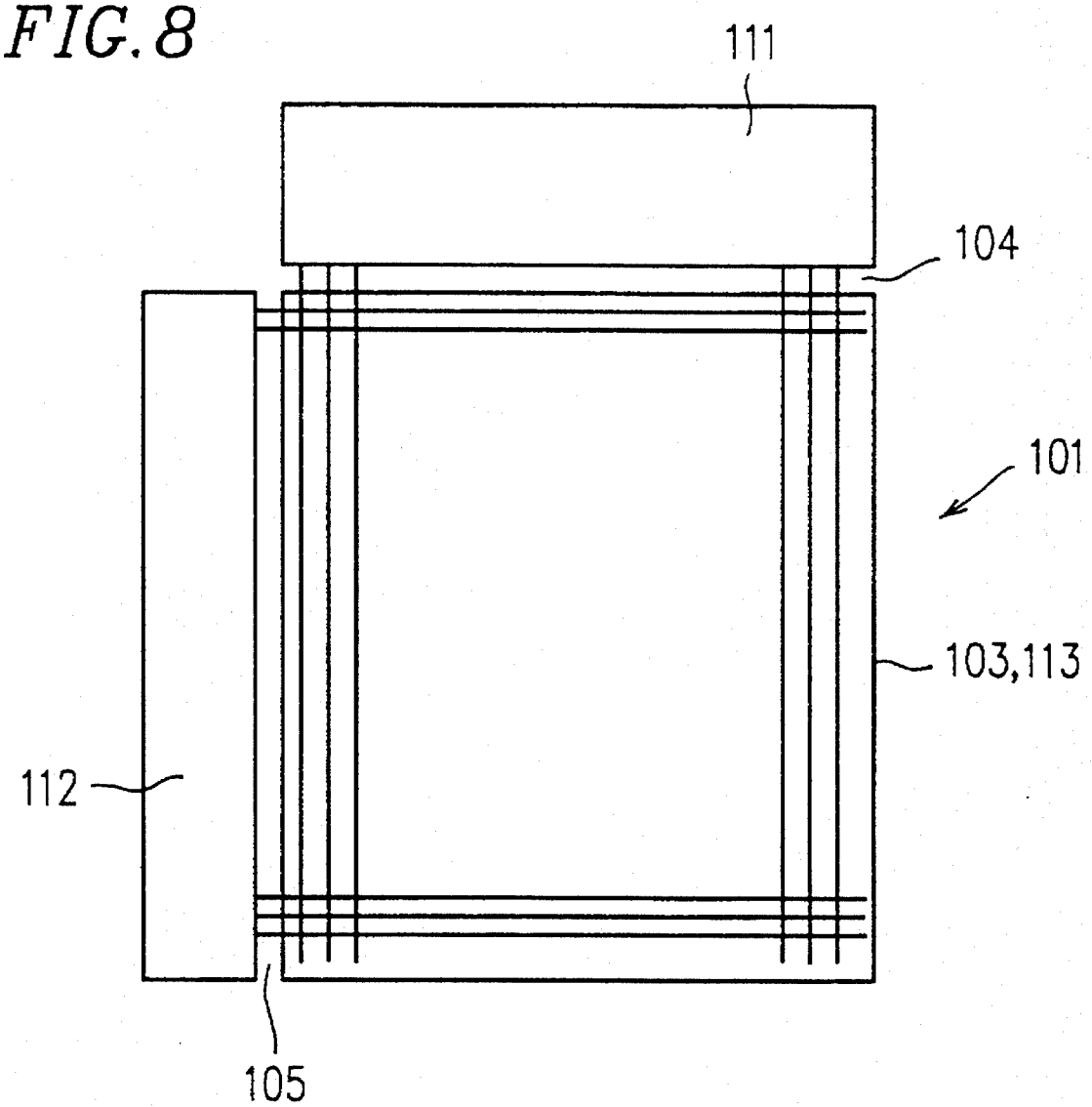
FIG. 8 is a block diagram showing a conventional liquid crystal display apparatus.
Figure 9:
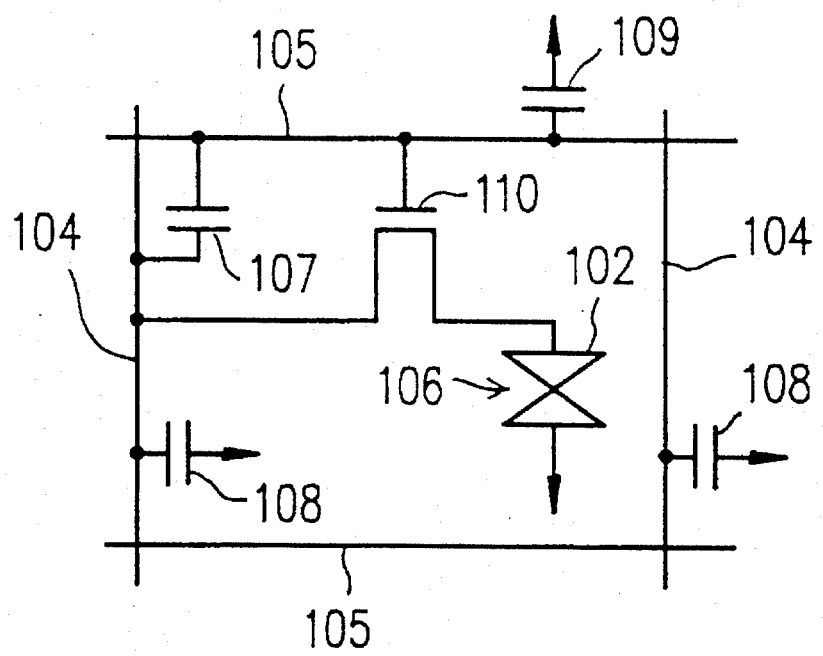
FIG. 9 is a diagram showing an equivalent circuit corresponding to one pixel of the liquid crystal display apparatus shown in FIG. 8.

The liquid crystal display apparatus of a third example of the present invention will be described hereinafter. FIG. 7 is a plan view showing the main portions of the liquid crystal display apparatus of the present example.

In the present example, as shown in FIG. 7, each of the source bus lines 5 is divided into two within the display section. Two data output circuits 2a and 2b are also provided for feeding a video signal to the source bus line 5. These data output circuits 2a and 2b are connected to the upper and lower portions of the divided source bus line 5, respectively. In the thus configured liquid crystal display apparatus, the upper portion of the source bus line 5 functions for displaying an image on the upper half of the display section, and the lower portion of the source bus line 5 functions for displaying an image on the lower half of the display section. In each of the upper and lower halves of the display section, the liquid crystal display apparatus of the present example is, as an electric circuit, equivalent to the liquid crystal display apparatus of the first example. Accordingly, display operations are performed in a manner as described for the first example.

Thus, each of the source bus lines is divided into the upper and lower portions so that one data output circuit is connected to the upper portion and the other data output circuit is connected to the lower portion. Thus, the parasitic capacitance per one source bus line can be reduced to be about one-half.

Also in the present example, a plurality of apertures 11 are provided in the counter electrode 3 at the portions opposed to the source bus lines 5. The aperture 11 may be formed into the shape of a strip as mentioned in the first example, or in the shape of an elongated hole which is not contiguous to the adjacent aperture 11 of the same row as mentioned in the second example. Alternatively, it may be formed into other arbitrarily different shapes.

Moreover, in order to enhance the display contrast of the display apparatus, the display apparatus may be provided with a light blocking film for blocking the light transmitted through the gap between the pixel electrode and the adjacent bus line. In a case where the light blocking film made from a metallic thin film is provided on the substrate 13, apertures 11' similar to the apertures formed in the counter electrode may be formed in the light blocking film, whereby the same effects as those obtained without a light blocking film are assured. In a case of forming a light blocking film from an insulating material, the light blocking film may be formed on either of the substrates 12 or 13.

The data output circuits 2a and 2b may be formed on the substrate 12. In this case, it is desirable that the active elements included in the data output circuits 2a and 2b and the display section are transistors having a mobility of $\mu \geq 5$ cm$^2$/V·s. As such a transistor, for example, the transistor having a substrate or a thin film formed of polycrystalline silicon, singlecrystalline silicon, sapphire and diamond, which includes a polycrystalline silicon TFT, a singlecrystalline silicon TFT and a sapphire-on-silicon (SOS) element, is usable.

Also, in a case where the provision of the apertures 11 makes the value of the resistance of the counter electrode 3 increase and results in an apprehension that display defects may occur, an auxiliary electrode 20 may be provided in the peripheral portion of the counter electrode 3, similarly to the above-mentioned first example. As a material of the auxiliary electrode 20, a conductive material such as Al, Cr, Ti and the like may be used.

In addition, the configuration of the display section of the present example is not limited to that shown in the figures. For example, another component such as an additional capacitance or the like may be provided if necessary.

As described hereinbefore, in the liquid crystal display apparatus of the present invention, a plurality of apertures are provided in the counter substrate opposed to the active matrix substrate having pixel electrodes, gate bus lines, source bus lines and the like, so that each of the apertures is opposed to the source bus line. This makes it possible to reduce the capacitance value of the parasitic capacitance formed between the source bus line and the counter electrode. As a result, in spite of employing a method of holding a video signal by using the parasitic capacitance formed at the intersection of the gate bus line and the source bus line and that formed between the source bus line and the counter electrode, a large-sized liquid crystal display apparatus for displaying an image of high definition is realized without making the configuration of the data output circuit more complicated. The aperture may be formed into a variety of shapes, e.g., a strip shape and a shape of an elongated hole which is not contiguous to the adjacent aperture of the same row.

In a case where the display apparatus is compact, the size of the aperture is adjusted in accordance with the driving ability of the data output circuit, the capacitance value formed at the intersection of the bus lines, and the like. This allows the parasitic capacitances existing in the source bus line to be reduced to the minimum or optimized, advantageously for reducing the load on the data output circuit.

Furthermore, in a case where the light blocking film is made from a metallic thin film, the film is formed on the counter substrate, with the apertures being provided at the portions opposed to the source bus lines. Thus, the parasitic capacitance formed between the light blocking film and the source bus line can be reduced. As a result, the total parasitic capacitance existing on one source bus line can be minimized. In a case where the light blocking film is formed on the active matrix substrate, the light blocking film is located at a position such that it covers the gap between the pixel electrode and the adjacent bus line. However, unless the light blocking film is electrically connected to a wiring other than the source bus line, the parasitic capacitance is not formed between the light blocking film and the source bus line. Consequently, the parasitic capacitance on the source bus line can be reduced. The light blocking film on the active matrix substrate may be made of an insulating material, which is also effective for reducing the parasitic capacitance on the source bus line.

Moreover, by providing the auxiliary electrode in the peripheral portion of the counter electrode, display defects due to provision of the apertures in the counter electrode can be prevented.

Furthermore, the source bus line may be divided into two, and one data output circuit may be provided for each of the divisional portions of the source bus line. Thus, the parasitic capacitance per one source bus line can be reduced to be about one-half.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising a first substrate, a second substrate having a counter electrode, and a liquid crystal layer sandwiched between the first substrate and the second substrates, the first substrate including:

a plurality of pixel electrodes arranged in a matrix;

a plurality of source bus lines for transmitting a plurality of data signals, each data line being disposed between columns of the plurality of pixel electrodes;

a plurality of active elements for electrically connecting each of the plurality of pixel electrodes to its adjacent source bus line and thereby feeding the plurality of data signals to the plurality of pixel electrodes; and a plurality of gate bus lines for transmitting scanning signals for controlling the plurality of active elements so as to be in a conductive or non-conductive state, each gate bus line being disposed between rows of the plurality of pixel electrodes, wherein the plurality of transmitted data signals are each held by parasitic capacitances of the plurality of source bus lines, and wherein the counter electrode has a plurality of apertures, and at least one of the plurality of apertures is disposed in a region opposed to the plurality of source bus lines.

2. A liquid crystal display apparatus according to claim 1, wherein the second substrate further includes a light blocking film formed in a region corresponding to gaps between the plurality of pixel electrodes, and the light blocking film has a plurality of apertures.

3. A liquid crystal display apparatus according to claim 2, wherein the apertures of the light blocking film are respectively adjusted to the plurality of apertures of the counter electrode.

4. A liquid crystal display apparatus according to claim 1, wherein the second substrate further includes a light blocking film formed in a region corresponding to gaps between the plurality of pixel electrodes, and the light blocking film is an insulating film.

5. A liquid crystal display apparatus according to claim 1, wherein the first substrate further includes a light blocking film formed in a region corresponding to gaps between the plurality of pixel electrodes.

6. A liquid crystal display apparatus according to claim 5, wherein the light blocking film is an insulating film.

7. A liquid crystal display apparatus according to claim 1, wherein each of the plurality of active elements is a transistor having a carrier mobility of $\mu \geq 5$ cm$^2$/V·s and the transistor has a substrate or a thin film formed of at least one material selected from a group of polycrystalline silicon, singlecrystalline silicon, sapphire and diamond.

8. A liquid crystal display apparatus according to claim 1, further comprising a data signal outputting means for receiving an externally input video signal and for outputting the received video signal to the plurality of source bus lines as the plurality of data signals, the data signal outputting means being formed on the first substrate.

9. A liquid crystal display apparatus according to claim 8, wherein the data signal outputting means includes at least one transistor having a carrier mobility of $\mu \geq 5$ cm$^2$/V·s, and the at least one transistor has a substrate or a thin film formed of at least one material selected from a group of polycrystalline silicon, singlecrystalline silicon, sapphire and diamond.

10. A liquid crystal display apparatus according to claim 8, wherein the data signal outputting means includes first and second data signal output circuits, and each of the plurality of source bus lines is divided into first and second parts, the first data signal output circuit outputting the plurality of data signals to the first part of each of the plurality of source bus lines, and the second data signal output circuit outputting the plurality of data signals to the second part of each of the plurality of source bus lines.

11. A liquid crystal display apparatus according to claim 8, wherein the data signal outputting means is monolithically formed on the first substrate.

12. A liquid crystal display apparatus according to claim 1, wherein the second substrate further includes an auxiliary electrode formed in the vicinity of an edge of the counter electrode.

13. A liquid crystal display apparatus according to claim 1, further comprising a data signal outputting means for receiving an externally input video signal and for outputting the received video signal to the plurality of source bus lines as the plurality of data signals, wherein the data signal outputting means includes first and second data signal output circuits, and each of the plurality of source bus lines is divided into first and second parts, the first data signal output circuit outputting the plurality of data signals to the first part of each of the plurality of source bus lines, and the second data signal output circuit outputting the plurality of data signals to the second part of each of the plurality of source bus lines.

14. A liquid crystal display apparatus according to claim 1, wherein each of the plurality of apertures is strip-shaped, and opposed to one source bus line.

15. A liquid crystal display apparatus according to claim 1, wherein each of the plurality of apertures is in the shape of an elongated hole.

16. A liquid crystal display apparatus according to claim 1, wherein each of the at least one aperture is sized in accordance with a capacitance value of each of the parasitic capacitances.

* * * * *